United States Patent [19]

Kobayashi et al.

[11] Patent Number: 4,811,119
[45] Date of Patent: Mar. 7, 1989

[54] APPARATUS FOR HIGH-DENSITY MINIMAL CROSSTALK RECORDING AND REPRODUCING OF TERMINANCE AND CHROMINANCE SIGNALS USING A MAGNETIC TAPE

[75] Inventors: Masaaki Kobayashi, Kawanishi; Akihiro Takeuchi, Ikoma; Kazuhiro Yamanishi, Higashiosaka; Sukeichi Miki, Ikoma; Yoshitomi Nagaoka, Neyagawa, all of Japan

[73] Assignee: Matsushita Electric Industrial Co., Ltd., Osaka, Japan

[21] Appl. No.: 890,347

[22] Filed: Jul. 30, 1986

[30] Foreign Application Priority Data

Aug. 2, 1985 [JP] Japan .................. 60-171505

[51] Int. Cl.$^4$ .................. H04N 5/782; H04N 9/79
[52] U.S. Cl. .................. 358/328; 358/330; 360/22; 360/30; 360/61
[58] Field of Search .................. 358/310, 328, 330, 358/340; 360/22, 61, 63, 64, 29, 30

[56] References Cited

U.S. PATENT DOCUMENTS 4,177,481 12/1979 Yamagiwa et al. .............. 358/328 X

OTHER PUBLICATIONS

Broadcast Engineering (Japan), vol. 35, No. 10, 1982 pp. 64-81.

Primary Examiner—Robert L. Richardson
Attorney, Agent, or Firm—Wenderoth, Lind and Ponack

[57] ABSTRACT

A magnetic tape recording/reproducing apparatus for recording video signals on a magnetic tape without providing a guard band between each two adjacent signal tracks. The apparatus comprises a first switching circuit for exchanging 2-channel component signals every nH period to obtain two combined signals each composed of the 2-channel signals which alternate every nH period, two modulators for modulating the two combined signals, a head section having two pairs of rotarty magnetic heads for recording the modulated signals on the magnetic tape so that each two adjacent blocks contain a same channel component signal and for reproducing the recorded signals from the magnetic tape, two demodulators for demodulating the reproduced signals, and a second switching circuit for exchanging the demodulated signals every nH to obtain the 2-channel component signals. With this arrangement, the recording density is remarkably increased and the cross talk interference hardly occur.

4 Claims, 3 Drawing Sheets

APPARATUS FOR HIGH-DENSITY MINIMAL CROSSTALK RECORDING AND REPRODUCING OF TERMINANCE AND CHROMINANCE SIGNALS USING A MAGNETIC TAPE

BACKGROUND OF THE INVENTION

1. Field of the Invention

This invention relates to a magnetic tape recording/reproducing apparatus for recording video signals on a magnetic tape and reproducing the recorded video signals and to a magnetic tape on which the video signals are recorded.

2. Description of the Prior Art

Recently, such video tape recorders (VTRs) have been developed that separate a color video signal into 2-channel component signals—luminance signal and chrominance signal—and record the 2-channel component signals on a video tape, such as RECAM (M format) VTRs and BETACAM VTRs, as disclosed in BROADCAST ENGINEERING (Japan), Vol. 35, No. 10, 1982, pp. 64–81.

In any of the conventional 2-channel component type VTRs, the 2-channel component signals are recorded on the magnetic tape in such a manner that luminance signal tracks 201, 203, 205 and chrominance signal tracks 202, 204, 206 are formed alternately on the magnetic tape 23 as shown in FIG. 6. In other words, each luminance signal track is adjacent to each chrominance signal track. Therefore, a guard band 207 (on which no signals are recorded) must be provided between each adjacent luminance signal and chrominance signal tracks to avoid a cross talk even if the luminance signal recording head and the chrominance signal recording head are arranged to be different in azimuth angle from each other. Arrows 24 and 29 show head and tape moving directions, respectively. Existance of the area occupied by the guard bands has been an obstacle to improve the recording density.

SUMMARY OF THE INVENTION

Therefore, an object of the present invention is to provide a video tape recording/reproducing apparatus which is capable of recording the 2-channel component signals on a magnetic tape so that signal tracks are formed without any unrecorded area between each two adjacent tracks thereby to realize a high density recording of video signals.

Another object of the present invention is to provide a magnetic tape on which the 2-channel component signals are recorded on tracks which are formed without any unrecorded area between each two adjacent tracks.

In order to achieve these objects, each of the signal tracks are divided to a plurality of blocks on which a first channel component signal and a second channel component signal are recorded alternately, and each two adjacent tracks are so arranged that a same channel signal is recorded on each two adjacent blocks of the respective tracks. In other words, the blocks are so arranged that the first and second channel component signals are recorded alternately on the blocks arranged in the longitudinal direction of each track, while on the blocks arranged in the perpendicular direction to the longitudinal direction of each track is recorded the same first or second channel component signal. With this arrangement the crosstalk will hardly occur although the signal tracks are not apart from each other through guard bands.

The video tape recording/reproducing apparatus of the present invention comprises a recording circuit section for converting 2-channel component signals to recordable signals, a head section for recording the recordable signals on a magnetic tape and reproducing the recorded signals from the magnetic tape, and a reproducing circuit section for converting the reproduced signals to the original 2-channel component signals. The recording circutt section comprises a first switching circuit for exchanging the 2-channel component signals every nH period (n: positive integer, H: horizontal synchronizing period) to obtain two combined signals each composed of the 2-channel component signals which alternate every nH period, and two modulators for modulating the two combined signals respectively to obtain the recordable signals. The head section has two pairs of rotary magnetic heads which are arranged to record the recordable signals on the magnetic tape to form signal tracks without any spaces between each adjacent two thereof corresponding to the two combined signals respectively so that each signal track is composed of a.plurality of blocks each corresponding to the nH period and each two adjacent blocks of the two adjacent signal tracks contain a same one of the 2-channel component signals. The reproducing circuit section comprises two demodulators for demodulating the reproduced signals to obtain the original two combined signals, and a second switching circuit for exchanging the two combined signals every nH period to obtain the original 2-channel component signals.

The above and other objects and features of the present invention will become more apparent from the following description of the preferred embodiments taken in connection with the accompanying drawings in which:

DESCRIPTION OF THE PREFERRED EMBODIMENT

Figure 1:
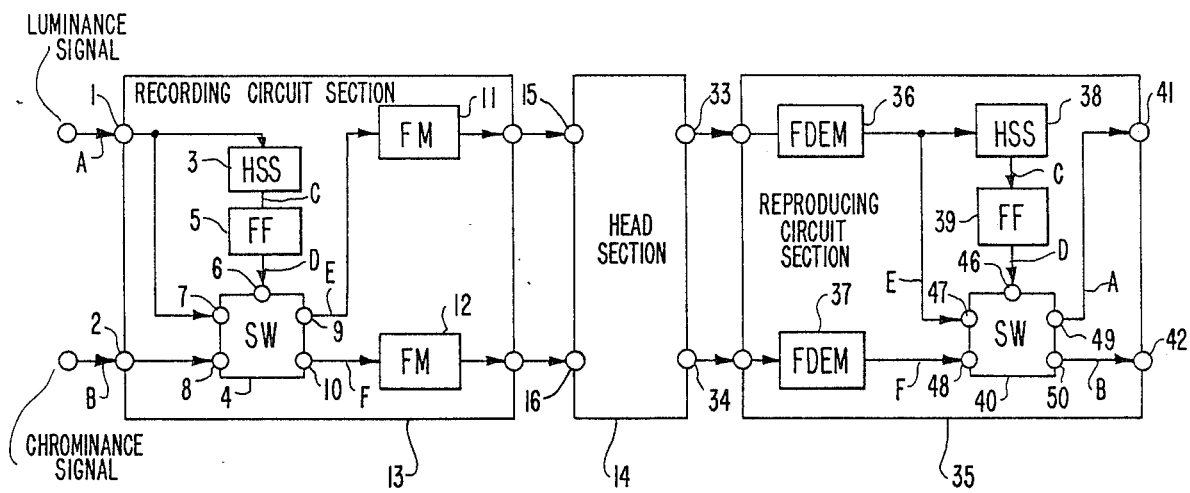
FIG. 1 is a block diagram showing an embodiment of the magnetic tape recording/reproducing apparatus according to the present invention.
Figure 2:
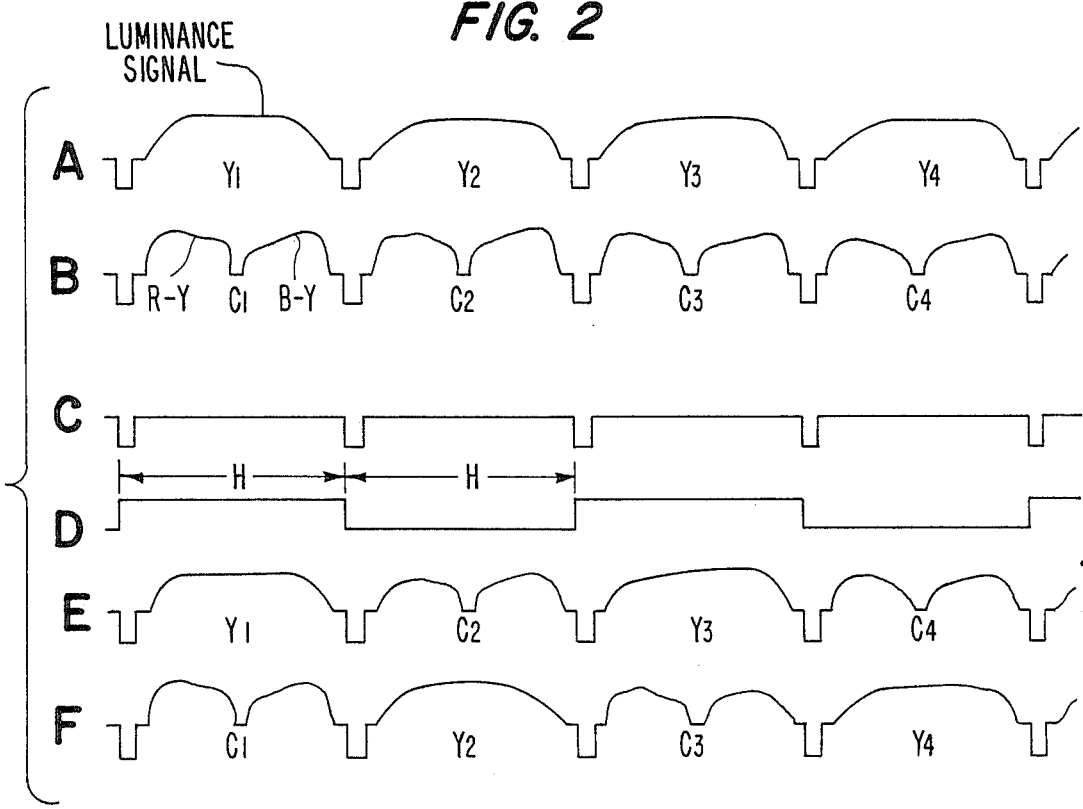
FIG. 2, A–F, is a wave form diagram showing signal wave forms at respective portions in the block diagram of FIG. 1, where A–F correspond to A–F in FIG. 1.

FIG. 1 shows an embodiment of the magnetic tape recording/reproducing apparatus of the present invention. The apparatus comprises a recording circuit section 13, a head section 14 and a reproducing circuit section 35. Signal wave forms at respective portion A–F are shown in FIG. 2. Hereafter, the symbols A–F will be used to identify the signals having the respective wave forms A–F shown in FIG. 2. Here, the 2-channel component signals are luminance signal A and time base compressed modulated chrominance signal B (in which two chrominance difference signals R-Y and B-Y are multiplexed) which are fed to input terminals 1 and 2 respectively of the recording circuit section 13. Such 2-channel component signals are supplied, for example, from a well-known video camera directly or, if necessary, through a well-known signal conversion circuit.

The luminance and chrominance signals A and B are respectively applied to first and second input terminals 7 and 8 of a first switching circuit (SW) 4. A horizontal synchronizing signal separation circuit (HSS) 3 separates horizontal synchronizing signals C from the luminance signal A. A flip-flop circuit (FF) 5 is responsive to the horizontal synchronizing signals C from HSS 3 to produce a switching control signal D which is applied to a control terminal 6 of the first SW 4.

Figure 3:
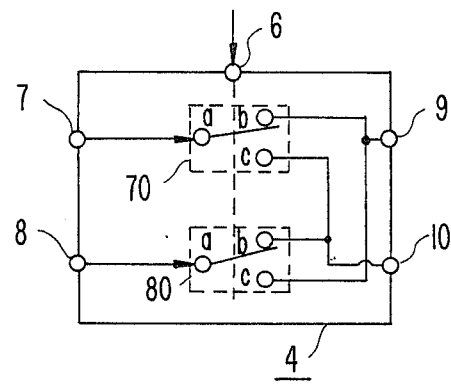
FIG. 3 is a circuit diagram showing an exemplary structure of the switching circuit in FIG. 1.

An exemplary internal structure of the first SW 4 is shown in FIG. 3. The first SW 4 comprises first and second change over switches 70 and 80 in each of which an input terminal a is connected to first and second output terminals b and c alternately in response to the switching control signal applied to the control terminal 6. The input terminals a of the first and second change over switches 70 and 80 are respectively connected to the first and second input terminals 7 and 8 of the first SW 4. The first output terminal b of the first change over switch 70 and the second output terminal c of the second change over switch 80 are connected to each other and further to a first output terminal 9 of the first SW 4. The second output terminal c of the first change over switch 70 and the first output terminal b of the second change over switch 80 are connected to each other and further to a second output terminal 10 of the first SW 4.

Accordingly, the luminance signal A applied to the first input terminal 7 of the first SW 4 is distributed to the first and second output terminals 9 and 10 of the first SW 4 alternately every horizontal synchronizing period H, and the chrominance signal B applied to the second input terminal 8 of the first SW 4 is distributed to the second and first output terminals 10 and 9 of the first SW 4 alternately every H. Thus, at the first output terminal 9 of the first SW 4 is obtained a first combined signal E composed of the luminance signal (Y) and chrominance signal (C) which alternately appear every H period, i.e., of $Y_1, C_2, Y_3, C_4, \ldots$, and at the second output terminal 10 of the first SW 4 is obtained a second combined signal F composed of the chrominance signal (C) and luminance signal (Y) which alternately appear every H period, i.e., of $C_1, Y_2, C_3, Y_4, \ldots$ The switching circuit having this function can be easily realized by either mechanical or electronic switches.

Referring again to FIG. 1, the first and second combined signals E and F are respectively frequency-modulated by a first frequency modulator (FM) 11 and a second frequency modulator (FM) 12 thereby to become recordable signals which are respectively applied to first and second input terminals 15 and 16 of the head section 14.

As described above, the recording circuit section 13 comprises HSS 3, FF 5, first SW 4, and first and second FMs 11 and 12.

Figure 4:
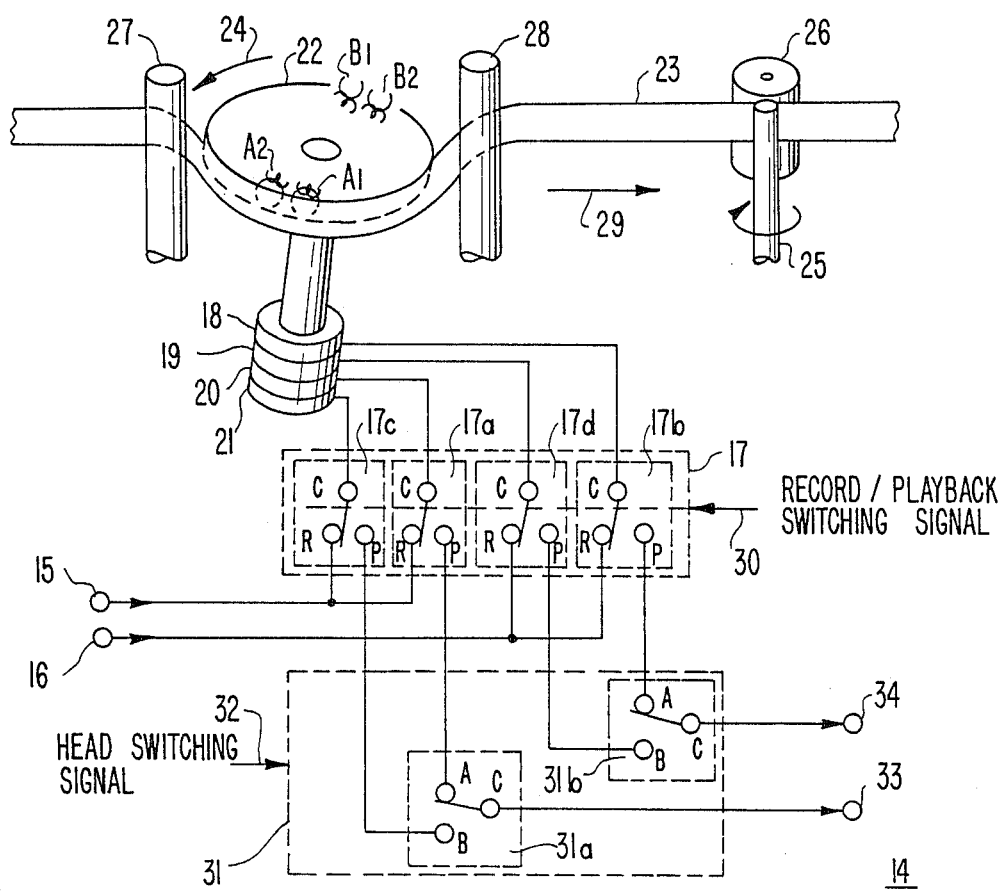
FIG. 4 is a circuit diagram showing an exemplary structure of the head section in FIG. 1.

An exemplary structure of the head section 14 is shown in FIG. 4. Four rotary magnetic heads $A_1$, $A_2$, $B_1$ and $B_2$ are mounted on a rotary disk 22 which is rotating at a speed of about 30 Hz in a direction indicated by an arrow 24. A magnetic tape 23 is driven by a capstan 25 and a pinch roller 26 to move in a direction indicated by an arrow 29 by the guidance of guide posts 27 and 28. The magnetic tape 23 contacts the cylindrical surface of the rotary disk 22 at an area ranging about 180° C. The magnetic heads $A_1$ and $A_2$ are disposed close to each other, and the magnetic heads $B_1$ and $B_2$ are disposed close to each other. The magnetic heads $A_1$ and $B_1$ are disposed apart by 180° from each other, and the magnetic heads $A_2$ and $B_2$ are disposed apart by 180° from each other. Rotary transformers 20, 18, 21 and 19 mounted on the rotational shaft of the rotary disk 22 are respectively coupled to the magnetic heads $A_1$, $A_2$, $B_1$ and $B_2$.

A record/playback switching circuit 17 comprises four change over switches 17a, 17b, 17c and 17d each of which has a common terminal C, a record terminal R and a playback terminal P and is controlled by a record/playback switching signal 30 to connect the common terminal C to the record terminal R in a recording mode and connect the common terminal C to the playback terminal P in a playback (or reproducing) mode. The record/playback switching signal is well-known in the art. The common terminals C of the change over switches 17a–17d are respectively connected to the rotary transformers 20, 18, 21 and 19. The record terminals R of the change over switches 17a and 17c are connected in common to the first input terminal 15 of the head section, and the record terminals R of the change over switches 17b and 17d are connected in common to the second input terminal 16 of the head section.

A head switching circuit 31 comprises two change over switches 31a and 31b each of which has a common terminal C, a A-head terminal A and a B-head terminal B and is controlled by a head switching signal 32 to connect the common terminal C to the A-head terminal A when the magnetic heads $A_1$ and $A_2$ are scanning the magnetic tape 23 and connect the common terminal C to the B-head terminal B when the magnetic heads $B_1$ and $B_2$ are scanning the magnetic tape 23, in the playback mode. The head switching signal 32 is a 2-state signal inverting its state every half turn of the rotary disk 22 and is well-known in the art. The A-head and B-head terminals A and B of the change over switch 31a are respectively connected to the playback terminals P of the change over switches 17a and 17c of the record/playback switching circuit 17, and the A-head and B-head terminals A and B of the change over switch 31b are respectively connected to the playback terminals P of the change over switches 17b and 17d of the record/playback switching circuit 17. The common terminals C of the change over switches 31a and 31b are respectively connected to first and second output terminals 33 and 34 of the head section.

The recordable signals, i.e., the frequency-modulated signals (FM signals) inputted to the input terminals 15 and 16 are transmitted through the record/playback switching circuit 17 and the rotary transformers 18-21 to the magnetic heads $A_1$, $A_2$, $B_1$ and $B_2$. More specifically, the first FM signal inputted to the input terminal 15 (corresponding to the first combined signal E in FIG. 2) is transmitted through the change over switches 17a and 17c and the rotary transformers 20 and 21 to the magnetic heads $A_1$ and $B_1$, and the second FM signal inputted to the input terminal 16 (corresponding to the second combined signal F in FIG. 2) is transmitted through the change over switches 17b and 17d and the rotary transformers 18 and 19 to the magnetic heads $A_2$ and $B_2$. During a first half turn of the rotary disk 22, the magnetic heads $A_1$ and $A_2$ scan the magnetic tape 23 to respectively record the first and second FM signals in the form of two adjacent signal tracks on the magnetic tape 23. During a second half turn of the rotary disk 22 next to the first half turn, the magnetic heads $B_1$ and $B_2$ scan the magnetic tape 23 to respectively record the first and second FM signals in the form of two adjacent signal tracks adjacent to the two adjacent signal tracks formed by the magnetic heads $A_1$ and $A_2$ on the magnetic tape 23.

Figure 5:
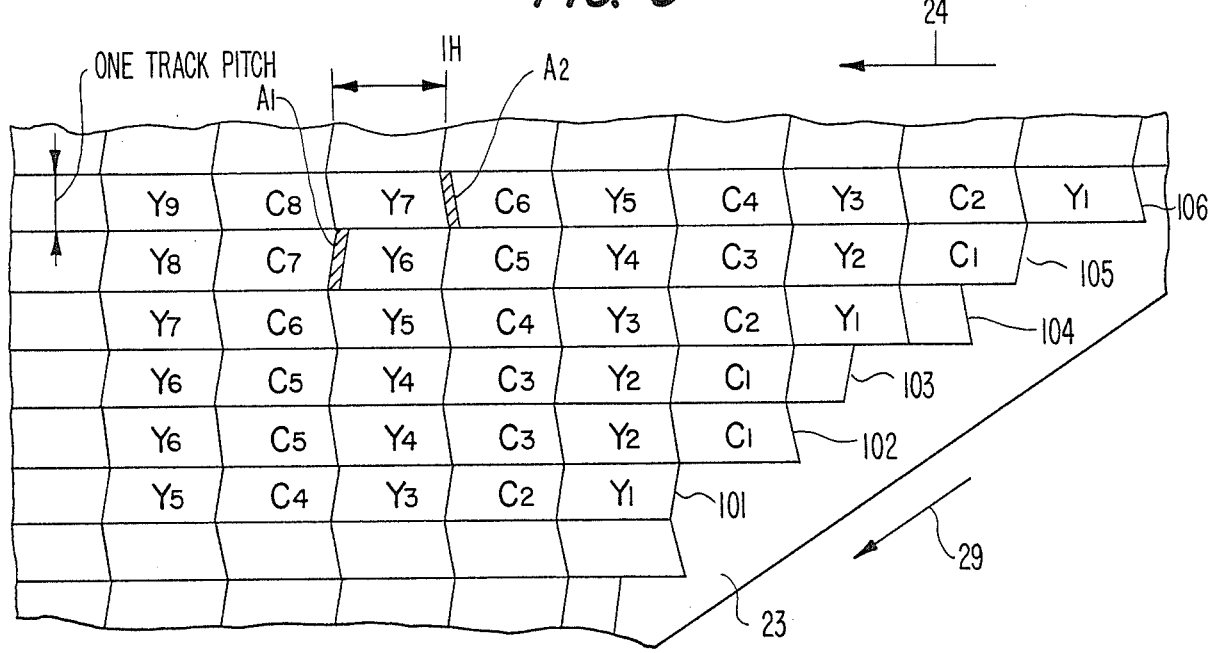
FIG. 5 is a partial track pattern diagram showing an exemplary signal track pattern on a magnetic tape according to the present invention.
Figure 6:
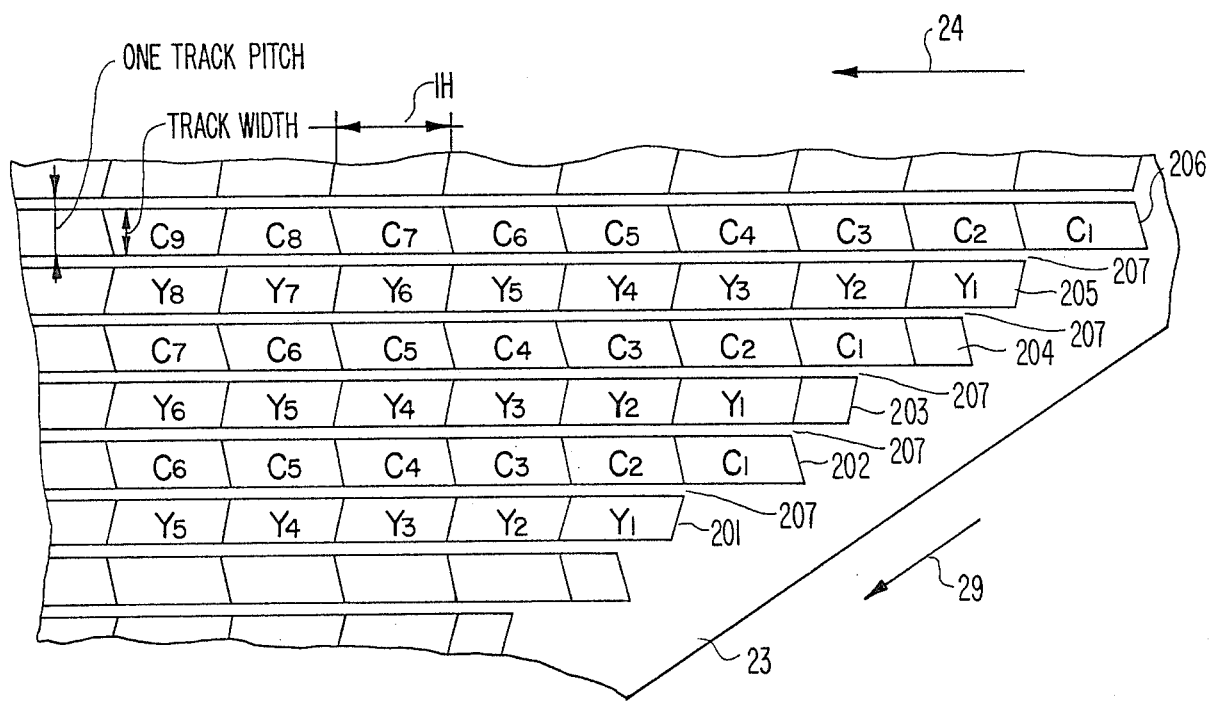
FIG. 6 is a partial track pattern diagram showing a conventional signal track pattern on a magnetic tape.

FIG. 5 shows a signal track pattern on the magnetic tape 23, in which an arrow 24 indicates a scanning direction of each magnetic head $A_1$, $A_2$, $B_1$ or $B_2$ and an arrow 29 indicates a moving direction of the magnetic tape 23. In FIG. 5, signal tracks 101 and 105 are formed by the magnetic head $A_1$, signal tracks 102 and 106 by the magnetic head $A_2$, a signal track 103 by the magnetic head $B_1$, and a signal track 104 by the magnetic head $B_2$. Each of the signals recorded on the signal tracks 101, 103 and 105 is the first FM signal corresponding to the first combined signal E in FIG. 2, and each of the signals recorded on the signal tracks 102, 104 and 106 is the second FM signal corresponding to the second combined signal F in FIG. 2.

The magnetic heads $A_1$ and $A_2$ are disposed so that they are shifted from each other by a distance corresponding to 1H period in the head moving (rotating) direction and by one track pitch in the vertical direction, i.e., in the track pitch (or track width) direction as shown in FIG. 5. Preferably, the magnetic heads $A_1$ and $A_2$ are positioned to be different in azimuth angle from each other as shown in FIG. 5 to enable azimuth recording. The magnetic heads $B_1$ and $B_2$ are disposed in the same way as the disposition of the magnetic heads $A_1$ and $A_2$. With this arrangement of the magnetic heads, (1) the signal tracks are formed without an unrecorded space between each adjacent two thereof, and (2) a luminance signal recorded block ($Y_1$, for example) of each signal track (101, for example) is adjacent to another luminance signal recorded block ($Y_2$) of an adjacent signal track (102) and a chrominance signal recorded block ($C_2$, for example) of each signal track (101, for example) is adjacent to another chrominance signal recorded block ($C_3$) of an adjacent signal track (102).

In other words, each signal track (101, for example) is composed of a plurality of blocks onwhich the luminance signal and chrominance signal are alternately recorded (as $Y_1$, $C_2$, $Y_3$, $C_4$, $Y_5$, . . . ), each block having a length (in the longitudinal direction of the track) corresponding to 1H period. At each boarder of each block exists a horizontal synchronizing signal. The horizontal synchronizing signals on each signal track are respectively adjacent to the horizontal synchronizing signals on an adjacent signal track so that the blocks are aligned in the track pitch direction perpendicular to the track length direction. The blocks arranged in a line in the track pitch direction contain a same kind signal, i.e. the luminance signal (as $Y_1$, $Y_2$, $Y_2$, $Y_3$, $Y_4$, $Y_5$, . . . , for example) or the chrominance signal (as $C_2$, $C_3$, $C_3$, $C_4$, $C_5$, $C_6$, . . . , for example). Since each two adjacent blocks in the track pitch direction contain a same kind signal, the signal on each block is little interfered by the cross talk of the signal on an adjacent block. Since there are no unrecorded spaces such as the conventional guard bands, the recording density can be remarkably increased.

In a playback (or reproduction) mode, each of the change over switches 17a–17d of the record/playback switching circuit 17 in FIG. 4 connects the common terminal C to the playback terminal P, and each of the change over switches 31a and 31b of the head switching circuit 31 connects the common terminal C to the A-head terminal A when the magnetic heads $A_1$ and $A_2$ are scanning the magnetic tape and to the B-head terminal B when the magnetic heads $B_1$ and $B_2$ are scanning the magnetic tape in response to the head switching signal. The correspondence between each magnetic head and the signal tracks scanned thereby is the same as that in the recording mode. Thus, the reproduced first and second FM signals respectively corresponding to the first and second combined signals E and F in FIG. 2 are obtained at the output terminals 33 and 34, respectively, of the head section.

Referring again to FIG. 1, the reproduced first and second FM signals are demodulated by first and second frequency demodulators (FDEMs) 36 and 37, respectively, to be reproduced first and second combined signals having the same wave forms as those of E and F in FIG. 2. The reproduced first and second combined signals are respectively applied to input terminals 47 and 48 of a second switching circuit (SW) 40. The second SW 40 has the same in structure as the first SW 4, where the first and second input terminal 47, 48, a control terminal 46 and first and second output terminals 49, 50 of the second SW 40 correspond to the first and second input terminals 7, 8, the control terminal 6 and the first and second output terminals 9, 10 of the first SW 4.

A horizontal synchronizing signal separation circuit (HSS) 38 separates the horizontal synchronizing signals C in FIG. 2 from the reproduced first combined signal. A flip-flop circuit (FF) 39 is responsive to the horizontal synchronizing signals C to produce a switching control signal D in FIG. 2 which is applied to the control terminal 46 of the second SW 40. By the operation of the second SW 40 as described before, the original luminance signal A in FIG. 2 and the original time base compressed modulated chrominance signal B in FIG. 2 are obtained at the first and second output terminals 49 and 50 of the second SW 40, respectively, and they are outputted from first and second output terminals 41 and 42 of the reproducing circuit section 35, respectively. The luminance and chrominance signals A and B outputted from the output terminals 41 and 42 are, if necessary, then mixed in a well-known manner to obtain a composite video signal before being fed to a television set.

Thus, the reproducing circuit section 35 comprises the first and second FDEMs 36 and 37, HSS 38, FF 39 and the second SW 40.

In the above embodiment, the 2-channel component signals alternate every H period (every horizontal synchronizing period). But, they may be modified to alternate every nH period (n: any positive integer), i.e., each block has a length corresponding to nH period. In this case, the magnetic heads $A_1$ and $A_2$ (or $B_1$ and $B_2$) are disposed apart by the distance corresponding to nH period in the head moving direction, and a 1/n frequency divider is provided between the horizontal synchronizing signal separation circuit and the flip-flop circuit.

Further, in the above embodiment, the 2-channel component signals are a luminance signal and a time base compressed modulated chrominance signal in which two chrominance difference signals R-Y and B-Y are multiplexed. But the 2-channel component signals may be other signals. For example, the first channel component signal is a luminance signal, and the second channel component signal is a time base compressd modulated chrominance signal in which three chrominance signals (R, G and B signals) are multiplexed. The second channel component signal may be a frequency multiplexed modulated chrominance signal in which the two chrominance difference signals (R-Y, B-Y) are multiplexed or the three chrominance signals (R, G, B) are multiplexed. In the case of MAC signal which is a 1-channel signal in which luminance and chrominance signals are time base compressed multiplexed, by providing a circuit for separating the luminance and chrominance signals in front of the recording circuit section the present invention can be applied.

Furthermore, the arrangements of the apparatus shown in FIG. 1, the switching circuit shown in FIG. 3 and the head section shown in FIG. 4 may be changed or modified in various manners without departing from the scope of the present invention which is solely defined in the appended claims.

What is claimed is:

1. A magnetic tape recording/reproducing apparatus comprising:
   a first signal transporting means for transposing luminance and chrominance signals of a video signal every nH period, wherein n is a positive integer and H is a horizontal synchronizing period of said video signal, so as to obtain two combined signals each composed of said luminance and chrominance signals which occur alternately every nH period;
   a means for frequency-modulating said two combined signals independently of each other to obtain two frequency-modulated signals each composed of frequency-modulated luminance and chrominance signals which occur alternately every nH period;
   a recording and reproducing means for recording said two frequency-modulated signals on a mangetic tape and for reproducing the recorded signals from said magnetic tape, said recording and reproducing means having two pairs of rotary magnetic heads which are arranged to record said frequency-modulated signals on said magnetic tape so as to form signal tracks without any spaces between two adjacent tracks thereof, said tracks respectively corresponding to said two frequency-modulated signals so that each of said signal tracks is composed of a plurality of blocks each having a length corresponding to said nH period and each two adjacent blocks of each two adjacent signal tracks have recorded therein a same one of said frequency-modulated luminance and chrominance signals;
   a means for frequency-demodulating the signals reproduced from said magnetic tape independently of each other so as to obtain two reproduced combined signals; and
   a second signal transposing means for transposing said two reproduced combined signals every nH period to obtain reproduced luminance and chrominance signals.

2. An apparatus according to claim 1, further comprising a means for generating first and second control signals for respectively controlling said first and second signal transposing means.

3. An apparatus according to claim 1, wherein each of said first and second signal transposing means comprises first and second changeover switches each having an input terminal and first and second output terminals, said first and second output terminals of said first changeover switch being respectively connected to said second and first output terminals of said second changeover switch and each of said first and second changeover switches changing over a connection of said input terminal to said first and second output terminals at intervals of nH period.

4. An apparatus according to claim 1, wherein said two pairs of rotary magnetic heads are mounted on a rotary disk, and each of said two pairs comprises first and second rotary magnetic heads which are disposed so as to be shifted from each other by a distance corresponding to nH period in a rotating direction of said first and second rotary magnetic heads and by a distance equal to one signal track pitch in a direction perpendicular to said rotating direction, said first and second rotary magnetic heads of one of said two pairs being respectively apart by 180° from those of the other head of said two pairs of heads.

* * * * *